US010812467B2

(12) United States Patent
Bernabeu et al.

(10) Patent No.: US 10,812,467 B2
(45) Date of Patent: Oct. 20, 2020

(54) METHOD FOR MANAGING A SECURE CHANNEL BETWEEN A SERVER AND A SECURE ELEMENT

(71) Applicant: GEMALTO SA, Meudon (FR)

(72) Inventors: Gil Bernabeu, Gemenos (FR); Olivier Potonniee, Gemenos (FR); HongQian Karen Lu, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 231 days.

(21) Appl. No.: 15/578,895

(22) PCT Filed: May 24, 2016

(86) PCT No.: PCT/EP2016/061716
§ 371 (c)(1),
(2) Date: Dec. 1, 2017

(87) PCT Pub. No.: WO2016/193072
PCT Pub. Date: Dec. 8, 2016

(65) Prior Publication Data
US 2018/0176211 A1   Jun. 21, 2018

(30) Foreign Application Priority Data

Jun. 2, 2015   (EP) .................................... 15305845

(51) Int. Cl.
*H04L 29/06*   (2006.01)
*H04W 12/06*   (2009.01)
(Continued)

(52) U.S. Cl.
CPC ........ *H04L 63/0823* (2013.01); *H04L 9/0844* (2013.01); *H04L 9/3013* (2013.01);
(Continued)

(58) Field of Classification Search
CPC ............. H04L 63/0823; H04L 63/0428; H04L 9/3013; H04L 9/0844; H04L 63/0853;
(Continued)

(56) References Cited

U.S. PATENT DOCUMENTS 6,085,320 A * 7/2000 Kaliski, Jr. ............. G06F 21/33
713/168
6,385,723 B1   5/2002 Richards
(Continued)

FOREIGN PATENT DOCUMENTS

EP        2 333 685 A1      6/2011
WO        WO 98/52161 A2   11/1998
WO        WO 2013/101084 A1  7/2013

OTHER PUBLICATIONS

International Search Report (PCT/ISA/210) dated Jun. 22, 2016, by the European Patent Office as the International Searching Authority for International Application No. PCT/EP2016/061716.
(Continued)

*Primary Examiner* — Huan V Doan
(74) *Attorney, Agent, or Firm* — Buchanan Ingersoll & Rooney PC

(57) ABSTRACT

The invention is a method for managing a secure channel between a server and a secure element embedded in a first device, wherein a user agent embedded in a second device establishes a HTTPS session with the server and retrieves a web application from the server, the method comprising the steps: the server sends to the web application an application certificate which is linked to a specific data reflecting the identity of the server, the secure element gets the application certificate and the specific data, the secure element checks the validity of the application certificate and that the application certificate is consistently linked to the specific data, in case of successful checks, the secure element and the server
(Continued)

generate an ephemeral session key and use it for opening a secure channel.

10 Claims, 2 Drawing Sheets

(51) Int. Cl.
*H04W 12/00* (2009.01)
*H04L 9/08* (2006.01)
*H04L 9/30* (2006.01)
*H04L 9/32* (2006.01)

(52) U.S. Cl.
CPC ........ *H04L 9/3242* (2013.01); *H04L 63/0428* (2013.01); *H04L 63/0853* (2013.01); *H04L 63/166* (2013.01); *H04W 12/003* (2019.01); *H04W 12/06* (2013.01); *H04W 12/00407* (2019.01)

(58) Field of Classification Search
CPC .. H04L 63/166; H04L 9/3242; H04W 12/003; H04W 12/06; H04W 12/00407
See application file for complete search history.

(56) References Cited

U.S. PATENT DOCUMENTS

| | | | | |
|---|---|---|---|---|
| 2005/0108571 A1* | 5/2005 | Lu | ........................... | G06F 21/34 726/4 |
| 2008/0189554 A1* | 8/2008 | Ali | ........................ | H04L 9/0877 713/189 |
| 2010/0125729 A1* | 5/2010 | Baentsch | ............ | H04L 63/0471 713/151 |
| 2011/0320818 A1* | 12/2011 | Krishna | .................. | G06F 21/34 713/175 |
| 2012/0246476 A1* | 9/2012 | Zhuang | .............. | G06Q 20/3563 713/168 |
| 2013/0301828 A1* | 11/2013 | Gouget | ................. | H04L 9/0844 380/44 |
| 2014/0018041 A1 | 1/2014 | Summerer | | |
| 2014/0189356 A1 | 7/2014 | Phegade et al. | | |
| 2015/0058831 A1* | 2/2015 | Warren | ..................... | G06F 8/41 717/140 |
| 2015/0067338 A1* | 3/2015 | Gero | ................... | H04L 63/0442 713/171 |

OTHER PUBLICATIONS

Written Opinion (PCT/ISA/237) dated Jun. 22, 2016, by the European Patent Office as the International Searching Authority for International Application No. PCT/EP2016/061716.
Sachdeva et al: "A Browser-Based Approach to Smart Card Connectivity", 2009 WEB 2.0 Security and Privacy Workshop, Retrieved from the Internet: URL:http://w2spconf.com/2009/papers/s4p4.pdf, [retrieved on May 27, 2010], Section 3, May 21, 2009, XP-002584531.
MacDonald et al., "Authentication & key agreement for off-portal mobile applications", Information Security Technical Report, vol. 13, No. 3, Section 6, Aug. 1, 2008, pp. 127-135, XP025658703.

* cited by examiner

METHOD FOR MANAGING A SECURE CHANNEL BETWEEN A SERVER AND A SECURE ELEMENT

FIELD OF THE INVENTION

The present invention relates to methods of managing a secure channel between a server and a secure element. It relates particularly to methods of establishing a secure channel between an application server and a secure element in a device.

BACKGROUND OF THE INVENTION

In a client/server system, an authentication of the client may be required in order to protect access to services or data of the server. The Username & Password scheme is one of the most widely used technique to authenticate users on servers like web sites. Another solution is to use a secret data stored in a secure element embedded in the client device for allowing the server to authenticate the client. For example, the communication between the application server and the secure element may be encrypted using a shared key.

A secure element is a tamper-resistant device which is intended to work with a host computer or to be hosted in a machine like a mobile phone, a Machine-to-Machine (M2M) device, or any host machine requiring secure computing. A secure element may be a smart card that can be connected to a host computer. A secure element may be removable like a Universal Integrated Circuit Card (UICC) or a secure memory card from its hosting machine. A secure element is generally a hardware-based component. A secure element may be welded to its hosting machine. A secure element permanently associated with its host device is called embedded secure element. A secure element may contain an application intended to be called by the connected hosting machine or by another machine. A secure element may contain computing means (like cryptographic services) or a secure storage means intended to be used by the connected hosting machine or by another machine.

There is a need for enhancing security for secure channels established between a secure element and an application server.

Existing applications, such as EMV payment, authenticate the EMV smart card (SE), but the SE cannot authenticate the application server. Malicious or compromised servers may try to access the SE. Therefore, there is a need for the SE to authenticate the application server.

SUMMARY OF THE INVENTION

An object of the invention is to solve the above mentioned technical problem.

The object of the present invention is a method for managing a secure channel between an application server and a secure element embedded in a first device. A user agent which is embedded in a second device establishes a HTTPS session with the application server and retrieves a web application from the application server. The application server sends to the web application an application certificate which is linked to a specific data reflecting the identity of the application server. The secure element gets the application certificate and the specific data. The secure element checks the validity of the application certificate and checks that the application certificate is consistently linked to the specific data. In case of successful checks, the secure element and the application server generate an ephemeral session key and open a secure channel using the ephemeral session key.

Advantageously, the specific data may be either a TLS server certificate used to establish the HTTPS session between the application server and the user agent or the origin of the application server in the sense of W3C®.

Advantageously, the application certificate may contain a hash of the specific data.

Advantageously, the ephemeral session key may be generated using an authenticated key exchange protocol requiring parameters, a signature of said parameters may be computed using a private key associated with the application certificate and sent to the secure element by the application server and the secure element may verify the signature.

Advantageously, the authenticated key exchange protocol may be based on Diffie-Hellman.

Another object of the invention is an application server able to establish a HTTPS session with a user agent and to send a web application to the a user agent, said user agent being adapted to communicate with an secure element. The application server is configured to provide the web application with an application certificate which is linked to a specific data reflecting the identity of the application server. The web application is configured to provide the secure element with the application certificate and the specific data. The application server is configured to generate an ephemeral session key with the secure element and to open a secure channel with the secure element using the ephemeral session key only if the secure element has successfully check both the validity of the application certificate and that the application certificate is consistently linked to the specific data.

Advantageously, the application server may be configured to add a hash of the specific data in the application certificate.

Advantageously, the application server may be configured to generate the ephemeral session key using an authenticated key exchange protocol requiring parameters and the application server may be configured to compute a signature of said parameters using a private key associated with the application certificate and to send the signature to the secure element.

Another object of the invention is a secure element embedded in a device and configured to receive an application certificate and a specific data reflecting the identity of an application server. The secure element is configured to check the validity of the application certificate, to check that the application certificate is consistently linked to the specific data and, in case of successful checks, to generate an ephemeral session key with the application server and to open a secure channel using the ephemeral session key.

Advantageously, the ephemeral session key may be generated using an authenticated key exchange protocol requiring parameters and the secure element may be configured to verify a signature of said parameters computed using a public key associated with the application certificate).

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to all kinds of client system able to establish a HTTPS (HyperText Transfer Protocol Secure) session with a server and to run a web application. In particular, it applies to client devices comprising a user agent, like a web browser, able to run a web application. These client devices may be devices like mobile phones, Personal Computers, Tablet PCs or any types of computer able to communicate with both a server and a secure element.

Figure 1:
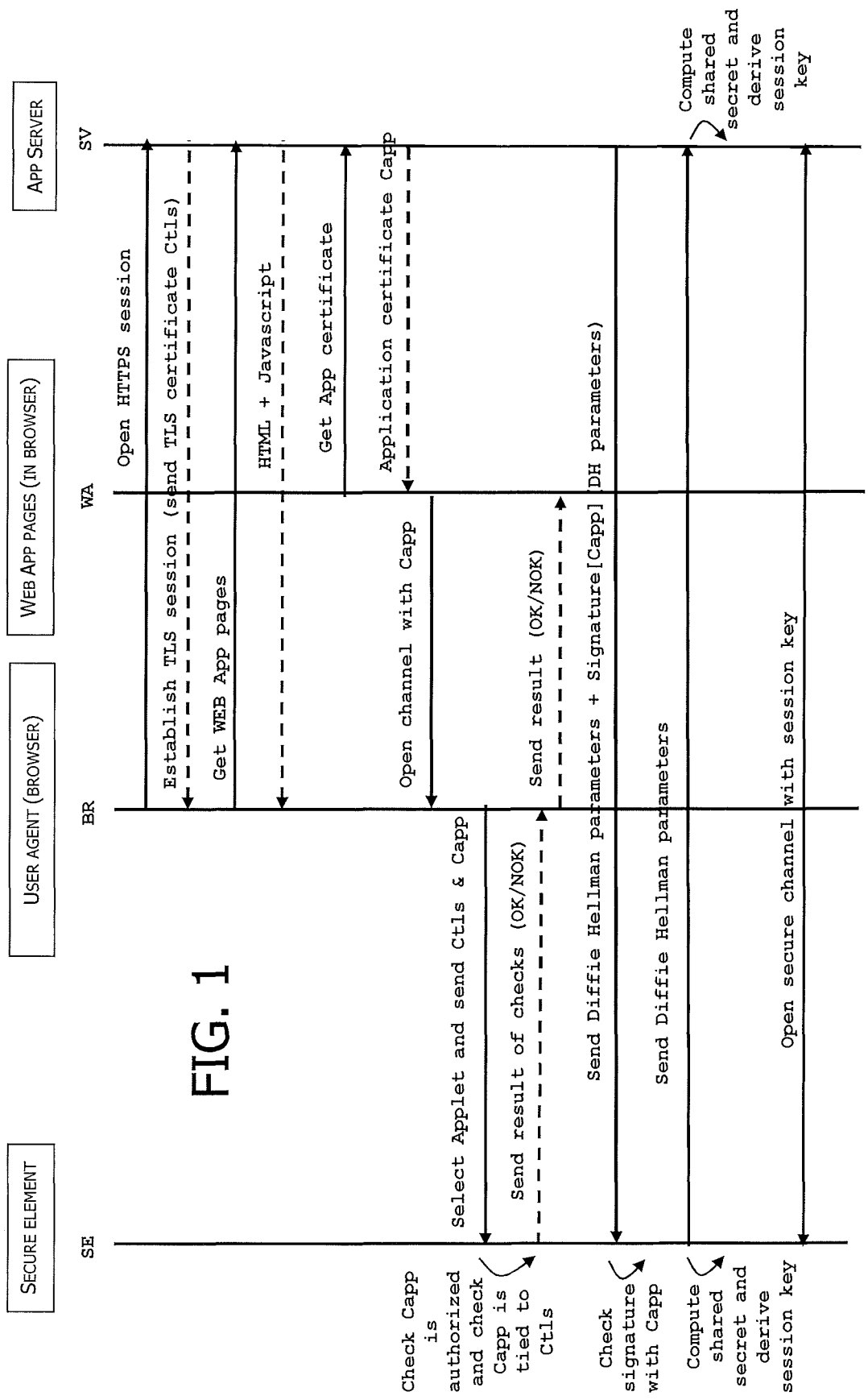
FIG. 1 is an example of a flowchart of secure channel establishment between a server and a secure element according to the invention.

FIG. 1 shows an example of a flowchart wherein a secure channel is established between an application server SV and a secure element SE according to the invention.

In this example, the client unit is a personal computer comprising both a user agent BR able to access the application server through a HTTPS session and a secure element SE. The user agent BR is a web browser and the secure element SE is a removable smart card. The personal computer includes a smart card reader.

The browser BR sends a first request to the application server SV for opening an HTTPS session. The application server SV establishes a HTTPS/TLS session and sends a TLS certificate Ctls to the browser BR.

Then the browser BR gets a web application from the server SV through the HTTPS session. For instance, the browser BR receives several HTML pages and a Javascript corresponding to the web application. Then the web application WA is started in the browser BR.

The web application WA requests that server SV sends an application certificate.

It is to be noted that the web application WA is a part of a complete application which includes another part. The other part is located in the application server SV. These two parts form the full application which is designed to work with another application (e.g. the applet) located in the secure element SE for providing a service. The requested application certificate is a certificate associated with the full application.

The full application may be designed to provide payment transactions or service accesses for example.

The server SV provides an application certificate Capp which is linked to a specific data reflecting the identity of the application server SV.

For example, the application certificate Capp can be generated once for all beforehand by an external entity and retrieved by the server SV. Alternatively, the server SV can generate the certificate Capp.

For instance, the certificate Capp may contain the hash of the specific data or may be partly generated by applying a XOR function to the specific data.

In one example, the specific data can be the TLS certificate Ctls. Thus, the application certificate Capp can be generated so as to contain information about the certificate Ctls used for establishing the HTTPS session.

In another example, the specific data can be the Origin of the application server SV. Thus, the application certificate Capp can be generated so as to contain information about the Origin of the application server SV. The Origin is considered preferably in the sense of W3C®. Usually, the Origin is determined by the combination of used protocol+port+domain (also called host).

For instance, with the following URL: https://www.SuperPaymentService.com:81/dir/appli, the origin is specified by the specific combination of the protocol "https", the domain www.SuperPaymentService.com and the port "81".

Then the web application WA initiates a request for opening a channel and provides the browser BR with the certificate Capp.

In response, the browser BR opens a channel with the secure element SE, selects an applet corresponding to the application and sends both the application certificate Capp and the certificate Ctls to the applet.

In the secure element SE, the applet checks that the application certificate Capp is authorized and checks that the application certificate Capp is consistently linked to the certificate Ctls. Depending on the common agreement between the applet and the server SV, the applet may check that the certificate Capp contains the hash of the certificate Ctls for instance.

Then the applet sends the result of these two checks to the browser BR which, in turn, sends the result to the web application WA.

At this stage, the web application WA is aware of the checks of both the application certificate Capp and the specific data.

In case of failure, the subsequent applicative commands will be rejected by the secure element SE.

In case of success, the web application WA sends a request (not shown at FIG. 2) to the application server SV to inform it that the access to the secure element is open. The server SV can send commands to the web application WA which, in turn, sends these commands to the secure element SE. The web application WA send results of these commands to the server SV. In other words, the web application WA (running in the browser) acts as a proxy between the server SV and the secure element SE. Thanks to this mechanism, the server SV and the secure element SE can exchange any data.

The server SV and the secure element SE use an authenticated key exchange protocol for agreeing on an ephemeral session key.

In this example, the server SV and the secure element SE are designed to use the Diffie-Hellman algorithm for establishing an ephemeral transaction key. Alternatively, they may use another algorithm like the ElGamal encryption system or the Elliptic Curve Diffie-Hellman (ECDH) algorithm.

The server SV sends its parameters (also named domain parameters) of the Diffie-Hellman algorithm to the secure element SE.

Advantageously, the server SV may add signature of these parameters generated with a private key associated with the application certificate Capp. In this case, the secure element SE can check the authenticity and integrity of the parameters by verifying the received signature using the public key associated with the application certificate Capp.

Then the secure element SE sends its parameters of the Diffie-Hellman algorithm to the server SV.

From this point, both the server SV and the secure element SE are able to compute a shared secret and to derive an ephemeral session key.

The server SV and the secure element SE are now able to establish a secure channel with the computed session key. They can now perform a transaction through the secure channel. For example, through the secure channel, the server SV can verify the authenticity of the SE and conduct an EMV transaction with the SE.

Figure 2:
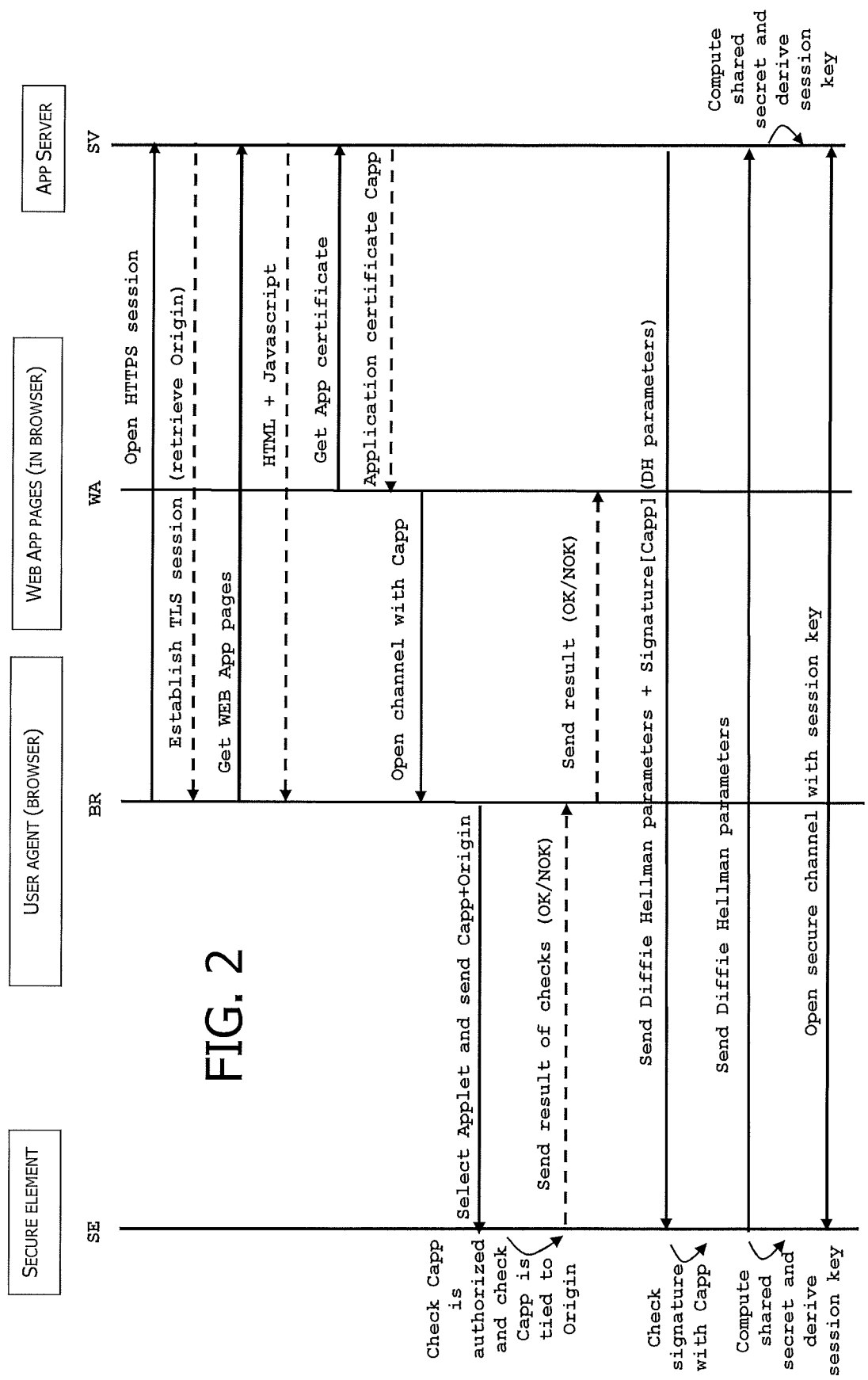
FIG. 2 is another example of a flowchart of secure channel establishment between a server and a secure element according to the invention.

FIG. 2 shows another example of a flowchart wherein a secure channel is established between an application server SV and a secure element SE according to the invention.

In this example, the client unit is a tablet computer comprising both a user agent BR able to access the application server SV through a HTTPS session and a secure element SE. The user agent BR is a web browser and the secure element SE is a tamper resistant module welded to the tablet computer.

The browser BR opens a HTTPS session with the application server SV and retrieves the Origin of the application server SV. The next exchanges are similar to those described at FIG. 1, where the browser BR gets the web application WA from the server SV and starts the web application WA.

The web application WA requests that server SV sends an application certificate.

The server SV provides an application certificate Capp which is linked to a specific data reflecting the identity of the application server SV. The server SV may get or pre-computed application certificate Capp.

In this example, the specific data linked to the application certificate Capp is generated from the Origin of the application server SV. Alternatively, it may be generated from the certificate Ctls. used for establishing the HTTPS session.

Then the web application WA initiates a request for opening a channel and provides the browser BR with the certificate Capp.

In response, the browser BR opens a channel with the secure element SE, selects an applet corresponding to the application and sends both the application certificate Capp and the Origin of the server SV to the applet.

In the secure element SE, the applet checks that the application certificate Capp is authorized. Advantageously, the applet is configured to accept all application certificates generated by a specific issuer. The applet also checks that the application certificate Capp is consistently linked to the provided Origin of the server SV. In other words, the secure element SE checks the binding between the application certificate Capp and the Origin of the server SV. Then the applet sends the result of these checks to the browser BR.

The browser BR sends to the web application WA a response to the previous request for opening a channel. This response is positive only if the check of the certificate Capp and the check of the link between the certificate Capp and the Origin is successful.

The further exchanges are similar to those described at FIG. 1: the secure element SE and the server SV generate an ephemeral shared key which is used for establishing a secure channel. Thus, they can perform a transaction through the secure channel.

The user agent and the secure element SE may be included in a single device or embedded in distinct devices configured to allow communication between the user agent and the secure element. For instance, the user agent may be embedded in a tablet PC while the secure element may be embedded in a mobile phone and both may communicate via Bluetooth® or NFC (Near Field Communication).

It is to be noted that all above described optional items presented in only one example may apply in any embodiment of the invention.

It must be understood, within the scope of the invention that the above-described embodiments are provided as non-limitative examples. In particular, the web application may be implemented using any relevant language and is not limited to application including a Javascript. The user agent is not limited to a browser and may be implemented as a software acting on behalf of the user for communication session like a mail reader application or any application requiring a user credential.

The invention claimed is:

1. A method comprising:
   managing a secure channel between an application server and a secure element embedded in a first device, wherein a user agent embedded in a second device establishes a HyperText Transfer Protocol secure (HTTPS) session with the application server and retrieves a web application from the application server, wherein a full application includes both the web application and another part located in the application server, said full application being designed to interact with an applet located in the secure element;
   wherein said managing comprises the steps:
      sending by the application server, to the web application, a certificate of the full application, said certificate of the full application containing a value generated from a specific data reflecting the identity of the application server;
      getting, by the secure element, the certificate of the full application and the specific data;
      checking, by the secure element, the validity of the certificate of the full application and checking, by the secure element, that the certificate of the full application contains the value generated from the specific data; and
      in case of successful checks, generating, by the secure element and the application server, an ephemeral session key and opening, by the secure element and the application server, a secure channel using the ephemeral session key
   wherein the ephemeral session key is generated using an authenticated key exchange protocol requiring parameters, wherein a signature of said parameters is computed using a private key associated with the certificate of the full application and sent to the secure element by the application server and wherein the secure element verifies the signature.

2. The method according to claim 1, wherein the certificate contains a hash of the specific data.

3. The method according to claim 1, wherein the authenticated key exchange protocol is based on Diffie-Hellman.

4. The method according to claim 1, wherein the specific data is a Transport Layer Security (TLS) server certificate used to establish the HTTPS session between the application server and the user agent.

5. The method according to claim 1, wherein the specific data is the origin of the application server as defined by the World Wide Web Consortium (W3C®).

6. The method according to claim 1, wherein the certificate of the full application has been partly generated by applying an XOR function to the specific data.

7. An application server comprising:
   a hardware processing unit; and
   instructions which cause the application server to:
      establish a HyperText Transfer Protocol secure (HTTPS) session with a user agent embedded in a second device,
      send a web application to the user agent, wherein a full application includes both the web application and another part located in the application server,
      provide, to the web application, a certificate of the full application, said certificate of the full application containing a value generated from a specific data reflecting the identity of the application server, said full application being designed to interact with an applet located in a secure element embedded in a first device, wherein, when running in the user agent, the web application is configured to provide the secure element with the certificate of the full application and the specific data, receive, from the web application, a request reflecting that the secure element successful checked both the validity of the certificate of the full application and that the certificate of the full application contains the value generated from the specific data, generate an ephemeral session key with the secure element, and open a secure channel with the secure element using the ephemeral session key only if the application server has received said request, wherein the application server is configured to generate the ephemeral session key using an authenticated key exchange protocol requiring parameters, wherein the application server is configured to compute a signature of said parameters using a private key associated with the certificate of the full application and to send the signature to the secure element, and wherein the secure element verifies the signature.

8. The application server according to claim 7, wherein the application server is configured to add a hash of the specific data in the certificate of the full application.

9. A secure element comprising:

a hardware processing unit;

an applet; and instructions which cause the secure element to:

receive, from a user agent embedded in a second device, a certificate of a full application and a specific data reflecting the identity of an application server, wherein the secure element is embedded in a first device, wherein the user agent establishes a HyperText Transfer Protocol secure (HTTPS) session with the application server and retrieves a web application from the application server, wherein the full application includes both the web application and another part located in the application server, said full application being designed to interact with the applet, check the validity of the certificate of the full application, and check that the certificate of the full application contains a value generated from the specific data, send to the user agent, in case of successful checks, a result reflecting the successful checks, generate an ephemeral session key with the application server, and open a secure channel with the application server using the ephemeral session key, wherein the ephemeral session key is generated using an authenticated key exchange protocol requiring parameters, wherein a signature of said parameters is computed using a private key associated with the certificate of the full application and received by the secure element from the application server, and wherein the secure element is configured to verify the signature.

10. The secure element according to claim 9, wherein the secure element is configured to verify the signature of said parameters computed using a public key associated with the certificate of the full application.

* * * * *